US011475710B2

(12) United States Patent
Yoo et al.

(10) Patent No.: US 11,475,710 B2
(45) Date of Patent: Oct. 18, 2022

(54) MULTI-MODAL EMOTION RECOGNITION DEVICE, METHOD, AND STORAGE MEDIUM USING ARTIFICIAL INTELLIGENCE

(71) Applicant: Genesis Lab, Inc., Seoul (KR)

(72) Inventors: Dae-Hun Yoo, Seoul (KR); Young-Bok Lee, Seoul (KR)

(73) Assignee: Genesis Lab, Inc., Seoul (KR)

( * ) Notice: Subject to any disclaimer, the term of this patent is extended or adjusted under 35 U.S.C. 154(b) by 226 days.

(21) Appl. No.: 16/985,094

(22) Filed: Aug. 4, 2020

(65) Prior Publication Data

US 2020/0364446 A1    Nov. 19, 2020

Related U.S. Application Data

(63) Continuation of application No. 16/200,518, filed on Nov. 26, 2018, now Pat. No. 10,740,598.

(30) Foreign Application Priority Data

Nov. 24, 2017  (KR) .......................... 10-2017-0158309
Jan. 2, 2018   (KR) .......................... 10-2018-0000136

(51) Int. Cl.
*G06V 40/00*   (2022.01)
*G06V 40/16*   (2022.01)
(Continued)

(52) U.S. Cl.
CPC ............ *G06V 40/176* (2022.01); *G06V 20/41* (2022.01); *G06V 40/171* (2022.01); *G06V 40/28* (2022.01);
(Continued)

(58) Field of Classification Search
CPC .... G06V 40/176; G06V 20/41; G06V 40/171; G06V 40/28; G06V 20/44; G06V 10/82;
(Continued)

(56) References Cited

U.S. PATENT DOCUMENTS

2010/0266213 A1   10/2010  Hill
2011/0263946 A1*  10/2011  el Kaliouby ............. A61B 5/16
                                                          600/300
(Continued)

FOREIGN PATENT DOCUMENTS

JP    2015-75908 A    4/2015
KR   10-0714535 B1    5/2007
(Continued)

OTHER PUBLICATIONS

Extended European Search Report for EP Application No. 18881797.7, dated Jul. 14, 2021.
(Continued)

*Primary Examiner* — Md K Talukder
(74) *Attorney, Agent, or Firm* — K&L Gates LLP

(57) ABSTRACT

A multi-modal emotion recognition system is disclosed. The system includes a data input unit for receiving video data and voice data of a user, a data pre-processing unit including a voice pre-processing unit for generating voice feature data from the voice data and a video pre-processing unit for generating one or more face feature data from the video data, a preliminary inference unit for generating situation determination data as to whether or not the user's situation changes according to a temporal sequence based on the video data. The system further comprises a main inference unit for generating at least one sub feature map based on the voice feature data or the face feature data, and inferring the user's emotion state based on the sub feature map and the situation determination data.

17 Claims, 9 Drawing Sheets

(51) Int. Cl.
*G06V 20/40* (2022.01)
*G06V 40/20* (2022.01)
*G10L 25/63* (2013.01)
*G10L 25/24* (2013.01)
*G10L 25/30* (2013.01)

(52) U.S. Cl.
CPC .............. *G10L 25/63* (2013.01); *G06V 20/44* (2022.01); *G10L 25/24* (2013.01); *G10L 25/30* (2013.01)

(58) Field of Classification Search
CPC .. G06V 40/113; G06V 40/161; G06V 10/454; G06V 40/175; G10L 25/63; G10L 25/24; G10L 25/30; G06K 9/629; G06K 9/6274
See application file for complete search history.

(56) References Cited

U.S. PATENT DOCUMENTS

| | | | | |
|---|---|---|---|---|
| 2014/0112556 | A1* | 4/2014 | Kalinli-Akbacak | G10L 17/26 382/128 |
| 2014/0192134 | A1* | 7/2014 | Jung | H04N 21/4788 348/14.02 |
| 2014/0212854 | A1 | 7/2014 | Divakaran et al. | |
| 2015/0193507 | A1* | 7/2015 | Rappoport | G06V 40/174 382/118 |
| 2015/0220159 | A1 | 8/2015 | Hyall et al. | |
| 2016/0358085 | A1* | 12/2016 | Abadi | G16H 50/70 |
| 2017/0084295 | A1* | 3/2017 | Tsiartas | G10L 17/08 |
| 2017/0351911 | A1 | 12/2017 | Hyatt | |
| 2018/0157901 | A1 | 6/2018 | Arbatman et al. | |
| 2019/0163965 | A1 | 5/2019 | Yoo et al. | |
| 2019/0347285 | A1 | 11/2019 | Yun et al. | |

FOREIGN PATENT DOCUMENTS

| | | |
|---|---|---|
| KR | 10-2010-0001928 A | 1/2010 |
| KR | 10-2013-0009123 A | 1/2013 |
| KR | 10-2013-0022434 A | 3/2013 |

OTHER PUBLICATIONS

Office Action of corresponding Korean Patent Application No. 10-2018-0000136—5 pages (dated Aug. 9, 2019).

International Search Report of PCT Application No. PCT/KR2018/014439—3 pages (dated Feb. 27, 2019).

* cited by examiner

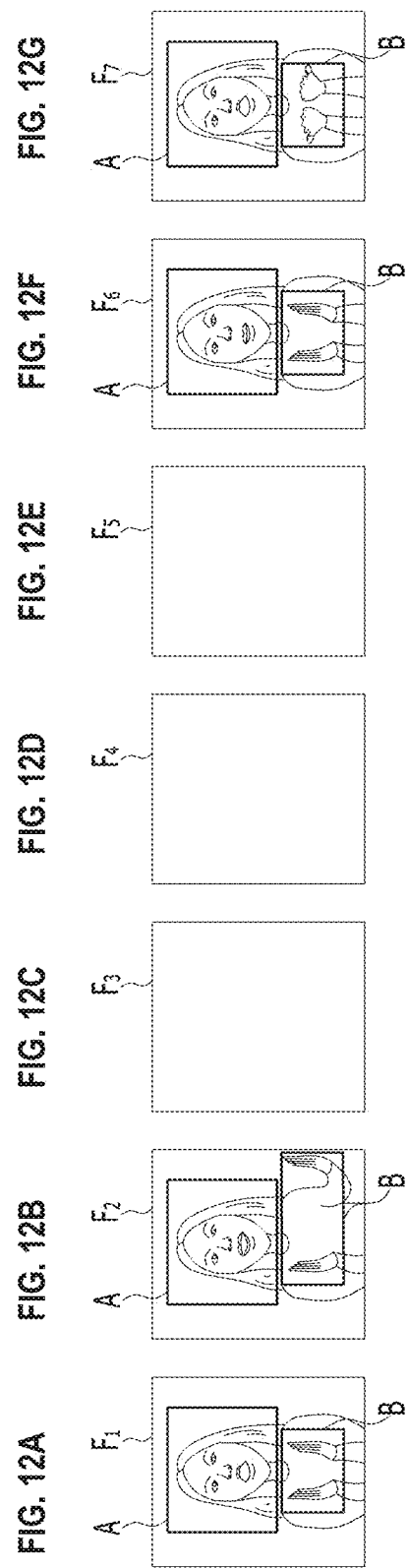

MULTI-MODAL EMOTION RECOGNITION DEVICE, METHOD, AND STORAGE MEDIUM USING ARTIFICIAL INTELLIGENCE

CROSS-REFRENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Technical Field

Embodiments of the present disclosure relate to multi-modal emotion recognition device, method, and storage medium using artificial intelligence.

Related Art

A conventional technology recognizes occlusion and processes it as an error. Covering a mouth with a hand is important information and can determine the intensity of the emotion state. Recognition information can be insufficient with the occlusion problem in a static image simply.

In addition, when a target person talks upon recognizing emotion with face expression, a false emotion recognition result is derived. In the emotion recognition through expression recognition, a mouth shape is very important information, but the mouth shape often changes upon talking, such that the mouth shape such as surprise, anger, and laugh can come out, resulting in a false recognition result.

SUMMARY

There are alternatives for solving the above problem when recognizing the emotion only with the face expression, and in a multi-modal, there approaches with a method for mixing face expression and voice information to minimize an error in order to minimize such noise. The present disclosure tracks the face or mouth shape to determine whether or not it is in a conversation state, and then when in the conversation state, it is possible to derive an accurate emotion recognition result by a method for minimizing mouth shape information and increasing the weight of voice feature information.

Embodiments of the present disclosure provide multi-modal emotion recognition device, method, and storage medium, which perform more accurate emotion recognition by using temporal information in addition to hand motion and identification information, mouth shape information, voice information, and partial expression information.

A multi-modal emotion recognition device using artificial intelligence in accordance with one aspect of an embodiment of the present disclosure includes, in the multi-modal emotion recognition device using artificial intelligence, a data input unit for receiving video data and voice data of a user; a data pre-processing unit including a voice pre-processing unit for generating voice feature data from the voice data and a video pre-processing unit for generating one or more face feature data from the video data; a preliminary inference unit for generating situation determination data as to whether or not the user's situation changes according to a temporal sequence based on the video data; and a main inference unit for generating at least one sub feature map based on the voice feature data or the face feature data, and inferring the user's emotion state based on the sub feature map and the situation determination data.

In addition, the situation determination data can include conversation determination data as to whether or not the user is in a conversation state or overlapping determination data as to whether or not a tracking target area that is a part of the entire video area of the video data and a recognition target area that is different from the tracking target area overlap with each other, the preliminary inference unit can generate conversation determination data for determining whether or not the user is in a conversation state based on the face feature data, or the preliminary inference unit can generate location inference data for inferring the location of the tracking target area based on the video data, and can generate overlapping determination data as to whether or not the tracking target area and the recognition target area overlap with each other based on the face feature data and the location inference data.

In addition, the preliminary inference unit can include a conversation state inference module for using a first learning model, and generating the conversation determination data based on the face feature data.

In addition, the face feature data can include mouth video data that is video data for the portion corresponding to the user's mouth in the recognition target area, and the conversation state inference module can generate the conversation determination data as to whether or not the user is in a conversation state from the mouth video data using the first learning model.

In addition, the preliminary inference unit can include a hand detection inference module for detecting hand video data for the tracking target area from the video data, and generating the location inference data based on the hand video data using a second learning model; and a face overlapping checking module for determining whether or not the recognition target area and the tracking target area overlap with each other based on the face feature data and the location inference data, and generating the overlapping determination data according to an overlapping determination result.

In addition, the hand detection inference module can generate a location inference feature map for the location inference data, and can infer the user's emotion state based on the sub feature map, the situation determination data, and the location inference feature map.

In addition, the situation determination data can further include recognition target area change data for a change in the recognition target area, and a weight of the recognition target area change data can increase as the change amount of the recognition target area becomes larger.

In addition, the tracking target area and the recognition target area can be formed for a plurality of users, respectively, the preliminary inference unit can generate the situation determination data for each user based on the tracking target area and the recognition target area, and can determine a conversation state for a plurality of users, respectively, to generate unique voice information of each user and can apply it to the emotion recognition of each user.

In addition, the main inference unit can include a plurality of sub feature map generation unit for generating the plurality of sub feature maps for the voice feature data and the face feature data based on the voice feature data and the face feature data using a third learning model; a multi-modal feature map generation unit for generating a multi-modal feature map from the plurality of sub feature map with reference to the situation determination data; and an emotion recognition inference unit for inferring the emotion state based on the multi-modal feature map using a fourth learning model.

In addition, the situation determination data can have a predetermined situation determination value according to the user's situation, and the multi-modal feature map generation unit can generate the multi-modal feature map by applying the situation determination value to at least one of the plurality of sub feature maps.

In addition, the voice pre-processing unit can include a voice correction module for correcting the voice data; and a voice feature data extraction module for extracting the feature of the voice data that has passed the voice correction module to generate the voice feature data.

In addition, the video pre-processing unit can include a face detector for detecting a recognition target area, which is an area corresponding to the user's face, in the entire area of the video data; an image pre-processor for correcting the recognition target area; and a face element extractor for setting a sub recognition target area that is located in the recognition target area and is smaller than the recognition target area, and generating the face feature data of the sub recognition target area.

In addition, the video pre-processing unit can further include a landmark detection module for extracting face element location information of the recognition target area.

In addition, the video pre-processing unit can include a location adjustor for adjusting the location based on the face element location information of the recognition target area.

In addition, the multi-modal emotion recognition device using artificial intelligence can further include an output unit for outputting the result of the emotion state using an activation function.

In addition, the video data can include a plurality of frames; when a feature map cannot be formed based on any specific frames of the plurality of frames, the application of a temporal learning model to all frames that cannot form the feature map can be excluded, the last frame in which the feature map immediately before the frame that cannot form the feature map is formed can be set as a replacement frame, and the user's emotion state can be recognized by applying the temporal learning model to the replacement frame; and the time corresponding to the all frames that cannot form the feature map can be a feature map non-detection time, and the temporal learning model can be applied to the replacement frame during the feature map non-detection time.

A multi-modal emotion recognition method using artificial intelligence in accordance with another aspect of an embodiment of the present disclosure includes inputting data that receives video data and voice data of a user; pre-processing data including pre-processing voice that generates voice feature data from the voice data and pre-processing video that generates one or more face feature data from the video data; performing preliminary inference that generates situation determination data as to whether or not the user's situation changes according to a temporal sequence based on the video data; and performing main inference that generates at least one sub feature map based on the voice feature data or the face feature data, and infers the user's emotion state based on the sub feature map and the situation determination data.

In addition, the situation determination data can include conversation determination data as to whether or not the user is in a conversation state or overlapping determination data as to whether or not a tracking target area that is a part of the entire video area of the video data and a recognition target area that is different from the tracking target area overlap with each other, the performing the preliminary inference can generate conversation determination data for determining whether or not the user is in a conversation state based on the face feature data, or the performing the preliminary inference can generate location inference data for inferring the location of the tracking target area based on the video data, and can generate overlapping determination data as to whether or not the tracking target area and the recognition target area overlap with each other based on the face feature data and the location inference data.

In addition, the performing the preliminary inference can include inferring a conversation state that uses a first learning model, and generates the conversation determination data based on the face feature data, the face feature data can include mouth video data that is video data for the portion corresponding to the user's mouth in the recognition target area, and the inferring the conversation state can generate the conversation determination data as to whether or not the user is in a conversation state from the mount video data using the first learning model.

In addition, the performing the preliminary inference can include inferring hand detection that detects hand video data for the tracking target area from the video data, and generates the location inference data based on the hand video data using a second learning model; and checking face overlapping that determines whether or not the recognition target area and the tracking target area overlap with each other based on the face feature data and the location inference data, and generates the overlapping determination data according to an overlapping determination result.

In addition, the inferring the hand detection can generate a location inference feature map for the location inference data, and can infer the user's emotion state based on the sub feature map, the situation determination data, and the location inference feature map.

In addition, the performing the main inference can include generating a plurality of sub feature maps that generates the plurality of sub feature maps for the voice feature data and the face feature data based on the voice feature data and the face feature data using a third learning model; generating a multi-modal feature map that generates a multi-modal feature map from the plurality of sub feature maps with reference to the situation determination data; and inferring emotion recognition that infers the emotion state based on the multi-modal feature map using a fourth learning model.

In addition, the situation determination data can have a predetermined situation determination value according to the user's situation, and the generating the multi-modal feature map can generate the multi-modal feature map by applying the situation determination value to at least one of the plurality of sub feature maps.

In addition, the pre-processing the voice can include correcting a voice that corrects the voice data; and extracting voice feature data that extracts the feature of the voice data that has passed the correcting the voice to generate the voice feature data.

In addition, the pre-processing the video can include detecting a face that detects a recognition target area, which is an area corresponding to the user's face, in the entire area of the video data; pre-processing an image that corrects the recognition target area; and extracting a face element that sets a sub recognition target area that is located in the recognition target area and is smaller than the recognition target area, and generates the face feature data of the sub recognition target area.

In addition, the pre-processing the video can further include detecting a landmark that extracts face element location information of the recognition target area.

In addition, the pre-processing the video can include adjusting a location that adjusts the location based on the face element location information of the recognition target area.

A computer readable storage medium for storing computer program codes for performing a multi-modal emotion recognition method using artificial intelligence in accordance with still another aspect of an embodiment of the present disclosure includes, in the computer readable storage medium for storing computer program codes for performing a multi-modal emotion recognition method, the multi-modal emotion recognition method using artificial intelligence including:

inputting data that receives video data and voice data of a user;

pre-processing data including pre-processing voice that generates voice feature data from the voice data and pre-processing video that generates one or more face feature data from the video data;

performing preliminary inference that generates situation determination data as to whether or not the user's situation changes according to a temporal sequence based on the video data; and performing main inference that generates at least one sub feature map based on the video feature data or the face feature data, and infers the user's emotion state based on the sub feature map and the situation determination data.

According to an embodiment of the present disclosure as described above, the multi-modal emotion recognition device can accurately confirm the emotion state when in conversation and when performing the expression occlusion with the hand.

BRIEF DESCRIPTION OF THE DRAWINGS

FIGS. 12A to 12G illustrate an emotion recognition procedure according to a situation change using a multi-modal emotion recognition device in accordance with yet another embodiment of the present disclosure.

DETAILED DESCRIPTION

Figure 1:
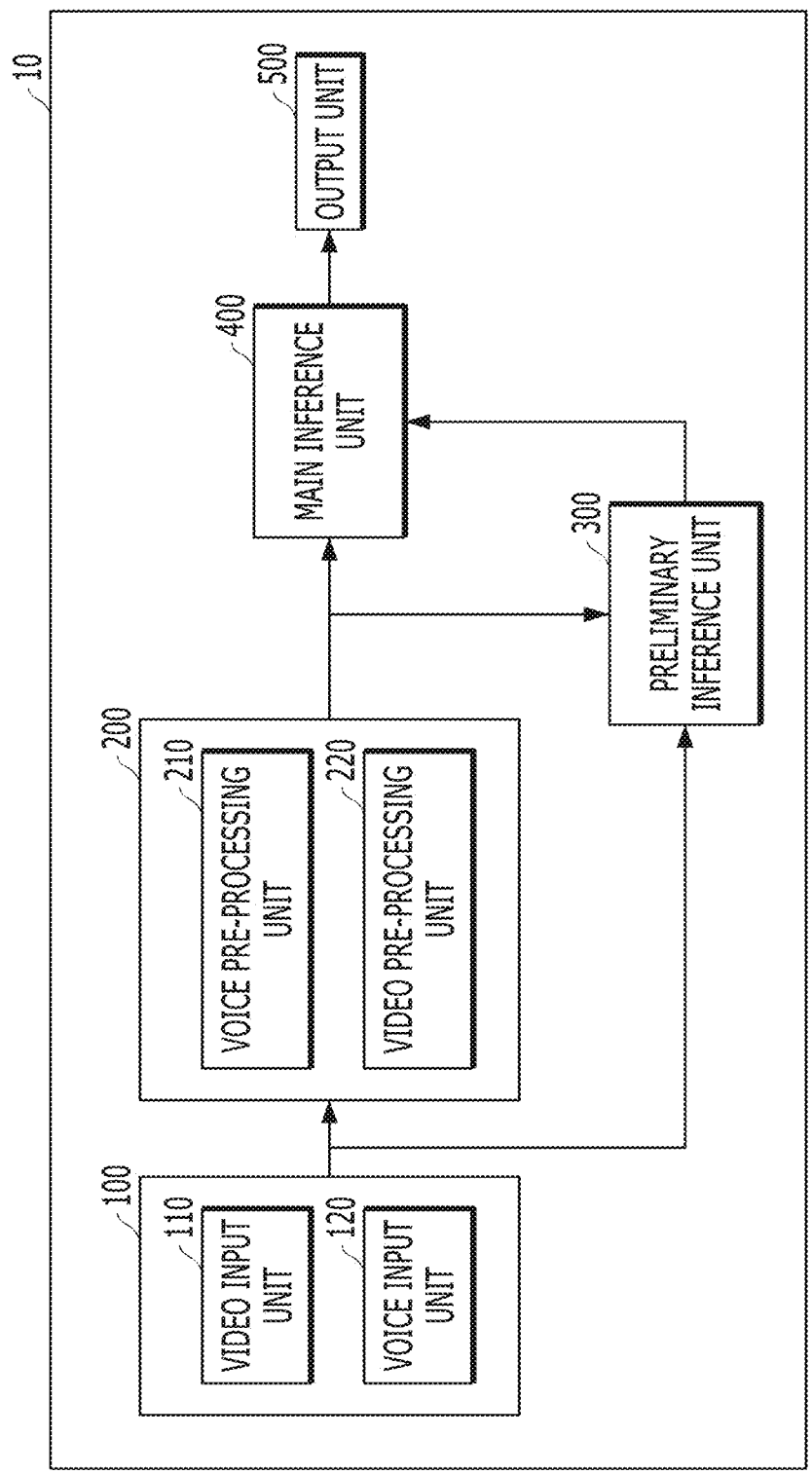
FIG. 1 is a diagram schematically illustrating a configuration of a multi-modal emotion recognition device in accordance with an embodiment of the present disclosure.

Hereinafter, exemplary embodiments of the present disclosure will be described with reference to the accompanying drawings so that those skilled in the art to which the present disclosure pertains can easily practice the present disclosure.

The present disclosure can be embodied in various forms and is not limited to the embodiments described herein. In order to clearly describe the present disclosure in the drawings, parts not related to the description have been omitted, and the same or similar components are denoted by the same reference numerals throughout the specification. In addition, the size and thickness of each component illustrated in the drawings are arbitrarily illustrated for convenience of explanation, and thus the present disclosure is not necessarily limited to those illustrated in the drawings.

In the present disclosure, the term "on" means located above or below the object member, and does not necessarily mean that the object is located on the upper portion with respect to the gravitational direction. In addition, throughout the specification, when a certain portion "includes" a certain component, this means that the other components are not excluded, but can be further included unless specially described otherwise.

Hereinafter, embodiments of the present disclosure will be described in detail with reference to the accompanying drawings, and in the following description with reference to the drawings, the same or corresponding components are denoted by the same reference numerals, and redundant description thereof will be omitted.

The present disclosure derives a more accurate emotion recognition result using artificial intelligence considering face expression, conversation state, hand, and voice based on the moving picture and voice data of the target person.

An aspect of the present invention provides a system and method for recognizing emotion from a human face using video analysis. The system analyzes a video containing one or more human faces, identifies one or more elements (nose, mouth, forehead, eyes) for each face, and monitors the identified elements. In embodiments, the system analyzes one or more video frames of the video to obtain a first set of indices (face feature data) indicating characteristic of one or more face elements of a person appearing in the video. The system also analyzes audio data of the one or more video frames to obtain a second set of indices (voice feature data) indicating characteristic of voice of the person. Using the first set of indices indicating facial element characteristic and the second set of indices indicating vocal characteristic, the system determines at least one emotion of the person for the one or more video frames.

In embodiments, to determine at least one emotion using the first set of indices and the second set of indices, the system applies a first weight to the first set of indices and a second weight to the second set of indices. In embodiments, the system adjusts the first weight and the second weight based on an event identified from the one or more video frames.

Referring to embodiments of FIGS. 12A-12G, the system analyzes a video comprising a first portion (frames $F_1$, $F_2$), a second portion (frames $F_3$, $F_4$, $F_5$) following the first portion and a third portion (frames $F_6$, $F_7$) following the second portion. In embodiments, for the first portion, the system uses 1.0 (default) as the first weight (for facial element characteristic index) and uses 0.2 (default) as the second weight (for vocal characteristic) to determine a emotion of face A in the first portion (frames $F_1$, $F_2$). When the system is not able to identify one or more elements of face A from the second portion (due to abnormal operation or obstruction by hands), the system lowers the first weight gradually from 1.0 to 0.8, 0.6, 0.4 respectively for frames $F_3$, $F_4$, $F_5$ of the second portion while maintaining 0.2 as the second weight such that the system relies less on the first set of indices (facial element characteristic) than the system does when the one or more elements of face A are available from the video frames. In certain embodiments, the system also adjusts the second weight for the second portion while lowering the first weight gradually from 1.0 to 0.8, 0.6 and 0.4. In certain embodiments, the system increase the second weight from 0.2 to 0.5 for the second portion such that the system relies more heavily on the second set of indices (vocal characteristic) than the system does for the first portion. In certain embodiments, for the second portion, the system adjust one or more of the first weight and the second weight to increase a ratio of the second weight to the first weight increases when one or more elements of face A is not available from video frames. In embodiments, for the third portion, the system uses the same weights when the first portion as abnormal operation (or obstruction by hands) of the second portion is addressed.

In certain embodiments, when the system is not able to identify one or more elements of face A from the a current video frame ($F_3$) or elements of face A are not clear enough to yield a set of indices to meet one or more predetermined reference threshold, the system considers features in the last frame ($F_2$) in computing compute the first set of indices (face feature data) for the current video frame. In embodiments, the systems computes a weighted value (for example 80%) of the first set of indices for the last frame ($F_2$) is added in computing the first set of indices (face feature data) for the current video frame as if for the current video frame includes an attenuated version (80%) of the last frame ($F_2$).

FIG. 1 is a diagram schematically illustrating a configuration of a multi-modal emotion recognition device in accordance with an embodiment of the present disclosure. Referring to FIG. 1, a multi-modal emotion recognition device 10 can include a data input unit 100, a data pre-processing unit 200, a preliminary inference unit 300, a main inference unit 400, and an output unit 500. The data input unit 100 can receive video data DV and voice data DS of a user. The data input unit 100 can include a video input unit 110 for receiving the video data DV for recognizing the user's emotion and a voice input unit 120 for receiving the voice data DS of the user.

In addition, the data pre-processing unit 200 can include a voice pre-processing unit 220 for generating voice feature data $DF_2$ from the voice data DS and a video pre-processing unit 210 for generating one or more face feature data $DF_1$ from the video data DV.

In this time, the face feature data $DF_1$ can include at least one of image, location information, size information, face ratio information, and depth information, and the voice feature data $DF_2$ can include information indicating the voice feature such as intonation, pitch information, speech intensity, and speech rate.

The video pre-processing unit 210 performs video pre-processing for extracting the face feature data $DF_1$ of the user from the video data DV.

The video pre-processing can convert video data DV into an appropriate form for using a learning model such as the entire or partial recognition of a face, noise removal, and feature and image extraction of the user's face.

The voice pre-processing unit 220 performs voice pre-processing for extracting the voice feature data $DF_2$ of the user from the voice data DS.

The voice pre-processing can convert the voice data DS into an appropriate form for using a learning model such as external noise removal, noise removal, and user voice feature extraction.

The preliminary inference unit 300 can generate situation determination data P as to whether or not the user's situation changes according to a temporal sequence based on the video data DV.

In this time, the situation determination data P can include conversation determination data $P_1$ as to whether or not the user is in a conversation state, or overlapping determination data $P_2$ as to whether or not a tracking target area B that is a part of the entire video area of the video data DV and a recognition target area A that is different from the tracking target area B overlap with each other.

Specifically, the preliminary inference unit 300 can generate location inference data $DM_1$ for inferring the location of the tracking target area B based on the video data DV, and can generate the overlapping determination data $P_2$ as to whether or not to the tracking target area B and the recognition target area A overlap with each other based on the face feature data $DF_1$ and the location inference data $DM_1$.

In addition, the preliminary inference unit 300 can generate the conversation determination data $P_1$ for determining whether or not the user is in a conversation state based on the face feature data $DF_1$.

The main inference unit 400 can generate at least one sub feature map FM based on the voice feature data $DF_2$ or the face feature data $DF_1$, and can infer the user's emotion state based on the sub feature map FM and the situation determination data P.

The output unit 500 can output the result of the emotion state inferred from the main inference unit 400.

In this time, the output unit 500 can output it in various shapes using an activation function such as a Sigmoid Function, a Step Function, a Softmax Function, and a Rectified Linear Unit (ReLU).

Figure 2:
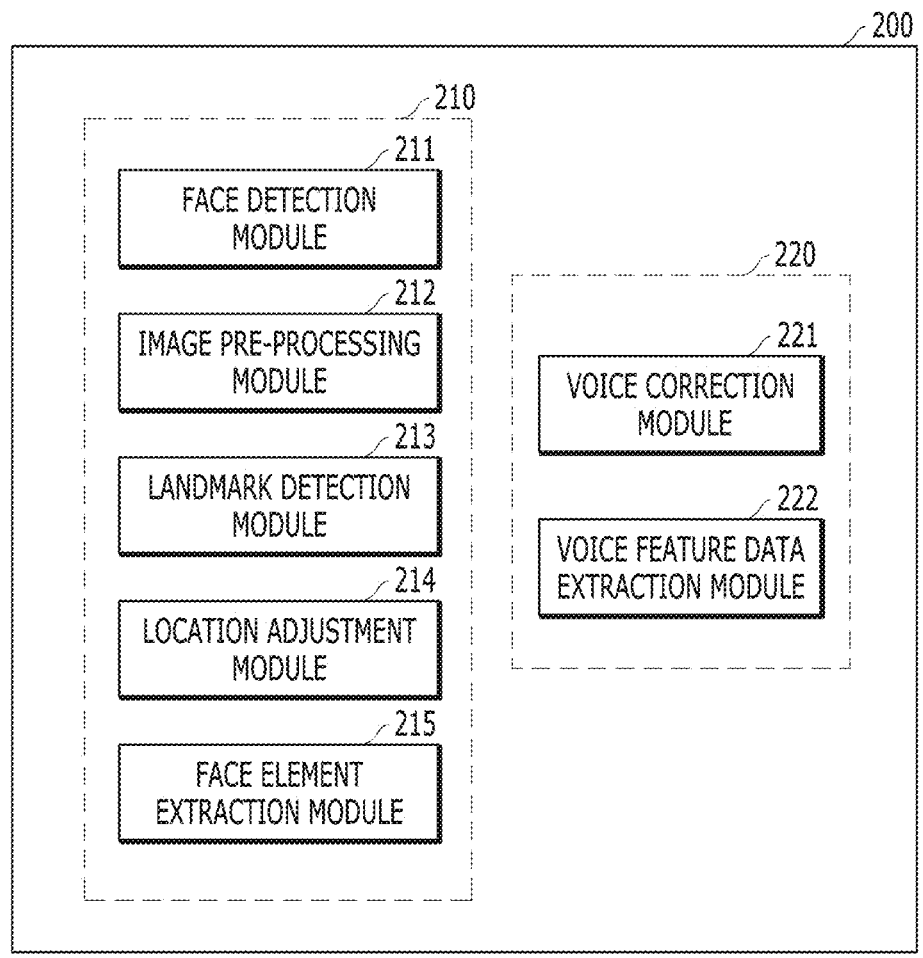
FIG. 2 is a diagram schematically illustrating a configuration of a data pre-processing unit in the multi-modal emotion recognition device of FIG. 1.

FIG. 2 is a diagram schematically illustrating a configuration of a data pre-processing unit in the multi-modal emotion recognition device of FIG. 1.

Referring to FIG. 2, the data pre-processing unit 200 can include a video pre-processing unit 210 and a voice pre-processing unit 220.

The video pre-processing unit 210 can include a face detector 211, an image pre-processing module 212, a landmark detection module 213, a location adjustment module 214, and a face element extraction module 215.

The face detector 211 can detect the recognition target area A that is an area corresponding to the user's face in the entire area of the video data DV.

The image pre-processing module 212 can correct the recognition target area A.

Specifically, the image pre-processing module 212 can perform image brightness, blur correction, and noise removal of the video data DV.

The landmark detection module 213 can extract the face element location information AL of the recognition target area A.

Specifically, the landmark detection module 213 can confirm the location information of a important face element such as a face, eyes, a mouth, a nose, and a forehead in the recognition target area A so that the face can be recognized.

The location adjustment module 214 can adjust the location based on the face element location information AL of the recognition target area A.

Specifically, the location adjustment module 214 can align the images horizontally or vertically based on the face element location information AL extracted from the landmark detection module 213.

The face element extraction module 215 can set a sub recognition target area AA that is located in the recognition target area A and is smaller than the recognition target area A, and can generate the face feature data $DF_1$ of the sub recognition target area AA.

The sub recognition target area AA can be a plurality of areas or one area in which at least one face element such as a face, eyes, a mouth, a nose, and a forehead is determined.

For example, when the eyes, the nose, and the mouth, in which the face element location information AL has been extracted in the recognition target area A, are extracted, the face element extraction module 215 can set an eye recognition area $A_1$, a nose recognition area $A_2$, and a mouth recognition area $A_3$ that are the sub recognition target area AA, and can generate at least one face feature data $DF_1$ for the set sub-recognition target area AA.

In addition, the face element extraction module 215 can generate the face feature data $DF_1$ based on the recognition target area A when the sub recognition target area AA is not set.

The voice pre-processing unit 220 can include a voice correction module 221 and a voice feature data extraction module 222.

The voice correction module 221 can correct the voice data DS.

Specifically, the voice correction module 221 can perform various correction methods such as various noises and external noise removal, a volume control, and frequency correction included in the voice data DS to generate the corrected voice data.

The voice feature data extraction module 222 can extract the feature of the voice data DS that has passed the voice correction module 221 to generate the voice feature data $DF_2$.

Specifically, the voice feature data extraction module 222 can generate the voice feature data $DF_2$ of the user through one or more modules of voice data, frequency, and spectrum analysis modules such as Mel-frequency Cepstral Coefficients (MFCC), Geneva Minimalistic Acoustic Parameter Set (eGeMAPS), and Logbank.

In this time, the voice feature data extraction module 222 can use the corrected voice data, or can also use the voice data DS.

Figure 3:
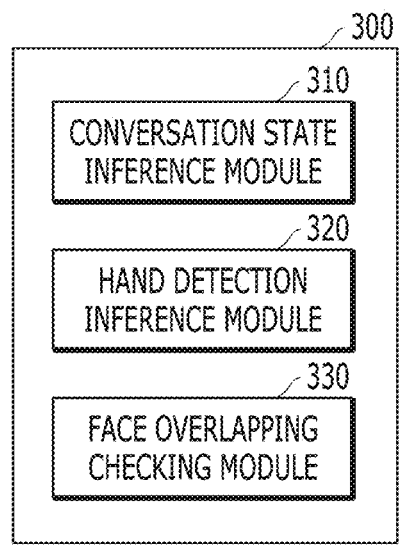
FIG. 3 is a diagram schematically illustrating a configuration of a preliminary inference unit in the multi-modal emotion recognition device of FIG. 1.

FIG. 3 is a diagram schematically illustrating a configuration of a preliminary inference unit in the multi-modal emotion recognition device of FIG. 1.

Referring to FIG. 3, the preliminary inference unit 300 can include a hand detection inference module 310, a conversation state inference module 320, and a face overlapping checking module 330.

The conversation state inference module 320 can use a first learning model $LM_1$, and can generate conversation determination data P1 based on the face feature data $DF_1$.

Specifically, the conversation state inference module 320 can use all or a part of the face feature data $DF1$ of the user, and can generate the conversation determination data P1 that determines whether or not it is in a conversation state using the first learning model $LM_1$ that can determine whether or not the user is in a conversation state.

The face feature data $DF_1$ can include mouth video data $DV_2$ that are the video data DV for the portion corresponding to the user's mouth in the recognition target area A, and can generate the conversation determination data $P_1$ as to whether or not the user is in a conversation state from the mouth video data $DV_2$ using the first learning model $LM_1$.

The first learning model $LM_1$ can be at least one method of artificial intelligence model, machine learning, and deep learning methods that can infer a temporal feature or a spatial feature such as Long Short-Term Memory (LSTM), Recurrent Neural Network (RNNs), Deep Neural Networks (DNN), and Convolutional Neural Network (CNN).

The hand detection inference module 310 can detect the hand video data $DV_1$ for the tracking target area B from the video data DV, and can generate location inference data $DM_1$ based on the hand video data $DV_1$ using a second learning model $LM_2$.

In this time, the second learning model $LM_2$ can be at least one method of artificial intelligence model, machine learning, and deep learning methods that can infer a temporal feature or a spatial feature such as Long Short-Term Memory (LSTM), Recurrent Neural Network (RNNs), Deep Neural Networks (DNN), and Convolutional Neural Network (CNN), and accordingly, can generate the location inference data $DM_1$ for the hand.

In addition, the hand detection inference module 310 can generate a location inference feature map $FM_1$ for the location inference data $DM_1$, and can infer the user's emotion state based on the sub feature map FM, the situation determination data P, and the location inference feature map $FM_1$.

In this time, the location inference feature map $FM_1$ can include feature information on the hand, that is, meaningful information on a hand motion such as information on a hand gesture and a hand location.

The face overlapping checking module 330 can determine whether or not the recognition target area A and the tracking target area B overlap with each other based on the face feature data $DF_1$ and the location inference data $DM_1$, and can generate the overlapping determination data $P_2$ according to an overlapping determination result.

Specifically, the overlapping determination data $P_2$ can determine whether or not the recognition target area A and the tracking target area B overlap with each other, and can generate one or more parameters for determining the importance and use of the corresponding face feature data $DF_1$ and the corresponding voice feature data $DF_2$ in the recognition target area A.

Figure 4:
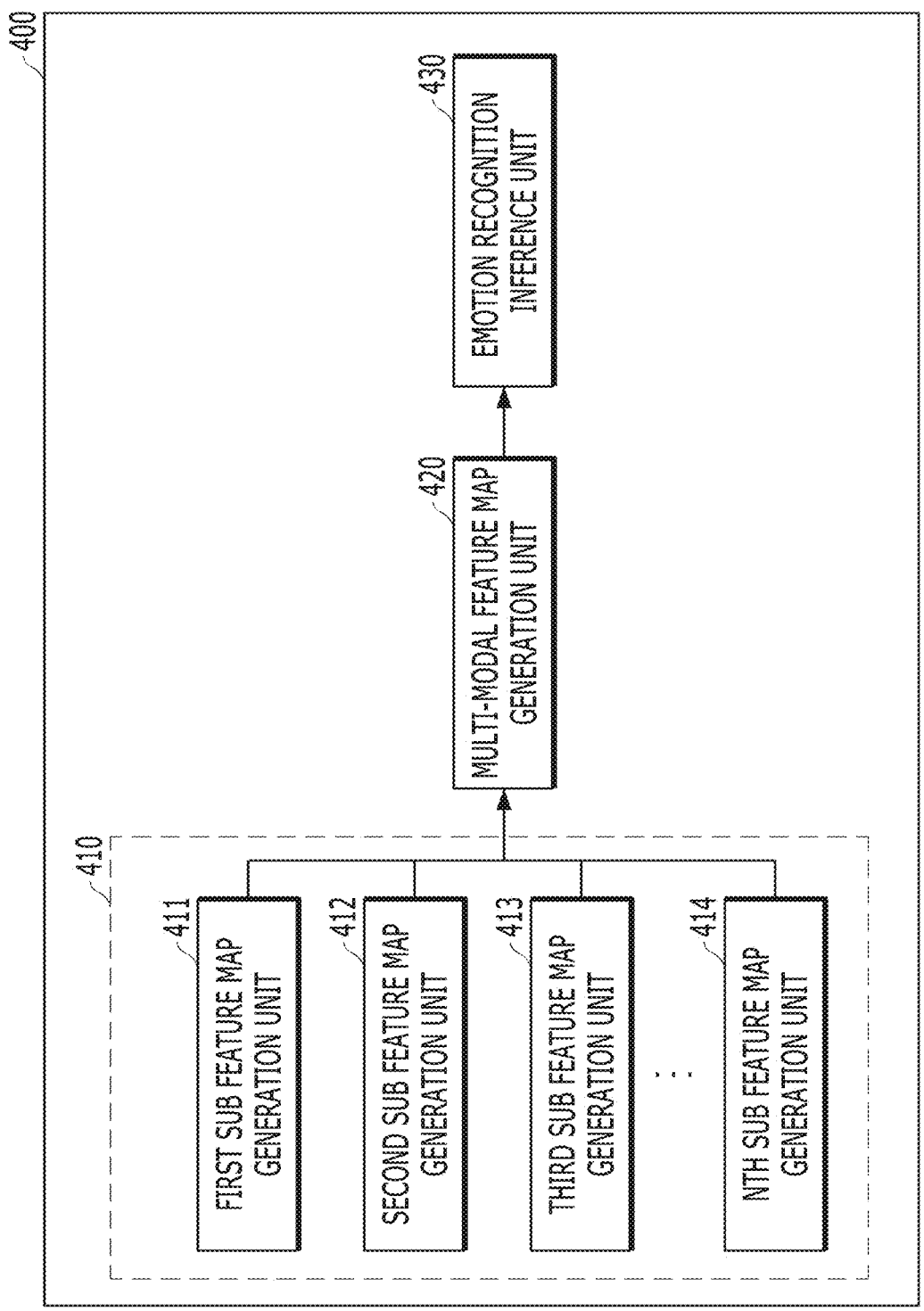
FIG. 4 is a diagram schematically illustrating a configuration of a main inference unit in the multi-modal emotion recognition device of FIG. 1.

FIG. 4 is a diagram schematically illustrating a configuration of a main inference unit in the multi-modal emotion recognition device of FIG. 1.

Referring to FIG. 4, the main inference unit 400 can include a plurality of sub feature map generation units 410, 411, 412, 413, 414, a multi-modal feature map generation unit 420, and an emotion recognition inference unit 430.

The plurality of sub feature map generation units 410, 411, 412, 413, 414 can generate a plurality of sub feature maps FM for the voice feature data $DF_2$ and the face feature data $DF_1$ based on the voice feature data DF2 and the face feature data $DF_1$ using a third learning model $LM_3$.

Specifically, the third learning model $LM_3$ can be at least one method of artificial intelligence model, machine learning, and deep learning methods that can infer at least one spatial feature such as Deep Neural Networks (DNN) and Convolutional Neural Network (CNN), and can generate a plurality of sub feature maps FM in which the features of the voice feature data $_{DF2}$ and the face feature data DF1 are implied using the third learning model $LM_3$.

The multi-modal feature map generation unit 420 can generate the multi-modal feature map M from the plurality of sub feature maps FM with reference to the situation determination data P.

The situation determination data P can have a predetermined situation determination value PV according to the user's situation, and the multi-modal feature map generation unit 420 can generate the multi-modal feature map M by applying at least one situation determination value PV of the plurality of sub feature maps FM.

Specifically, the situation determination value PV can be a parameter indicating the importance and use in which each sub feature map FM has.

The sub feature map FM to which the situation determination value PV of the situation determination data P is applied can be generated through the calculation of the situation determination data P and the sub feature map FM, and the multi-modal feature map M can be generated by integrating the plurality of sub feature maps FM.

For example, when the user's eyes are covered, the state determination value for the eyes is output as zero and zero is output by multiplying the state determination value for the eyes by the sub feature map FM for the eyes, and accordingly, the main inference unit 400 can generate the multi-modal feature map M based on other sub feature maps excluding the sub feature map for the eyes.

In addition, the location inference feature map $FM_1$ can be generated from the hand detection inference module 320, and the multi-modal feature map M that infers the user's emotion state can be generated based on the sub feature map FM, the situation determination data P, and the location inference feature map $FM_1$.

The multi-modal feature map M can be generated by merging at least one of the sub feature map FM and the location inference feature map $FM_1$ using Concat, Merge, and Deep Network.

The emotion recognition inference unit 430 can infer the emotion state based on the multi-modal feature map M using a fourth learning model $LM_4$.

In this time, the fourth learning model $LM_4$ can be a temporal learning model such as a cyclic neural network, for example, Long Short-Term Memory (LSTM), Recurrent Neural Network (RNNs), Gated Recurrent Unit, etc., and can be at least one method of artificial intelligence model, machine learning, and deep learning methods that can infer or analyze a temporal feature and a spatial feature.

Figure 5:
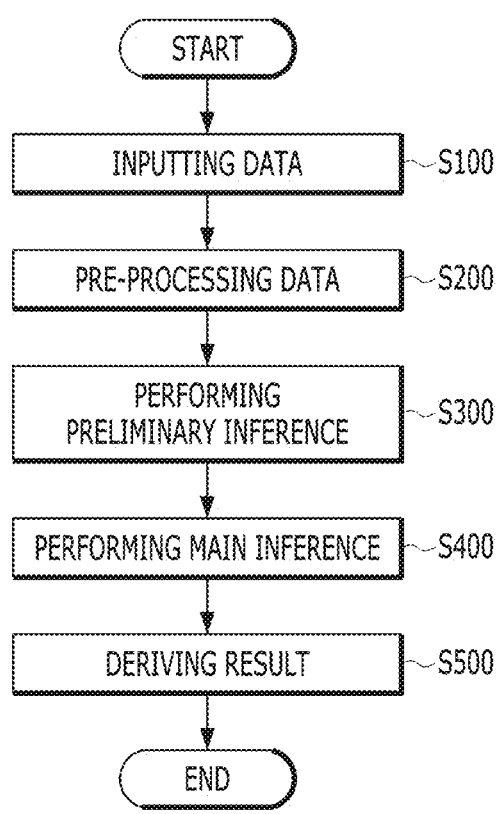
FIG. 5 is a flowchart illustrating a multi-modal emotion recognition method by the multi-modal emotion recognition device of FIG. 1.

FIG. 5 is a flowchart illustrating a multi-modal emotion recognition method by the multi-modal emotion recognition device of FIG. 1.

Referring to FIG. 5, inputting data that receives the video data DV and the voice data DS of the user S100 is performed.

Then, pre-processing data that includes pre-processing a voice that generates the voice feature data $DF_2$ from the voice data DS and pre-processing a video that generates one or more face feature data $DF_1$ from the video data DV S200 can be performed.

In this time, the pre-processing the data S200 can generate the face feature data $DF_1$ and the voice feature data $DF_2$ for using a learning model.

The learning model can be artificial intelligence, machine learning, and deep learning methods.

Then, based on the video data DV, performing preliminary inference that generates the situation determination data P as to whether or not the user's situation changes according to a temporal sequence can be performed.

In this time, the temporal sequence can become whether or not it is in a conversation state, and can be data for confirming the feature of a body motion.

In addition, the situation determination data P can include a parameter indicating the importance or use of one or more the face feature data $DF_1$ or the voice feature data $DF_2$ by determining whether or not to overlap and whether or not it is in a conversation state from the video data DV.

In addition, the feature information on the user's body other than one or more the face feature data $DF_1$ generated in the pre-processing the data S200 is extracted and generated therefrom.

Then, performing main inference that generates at least one sub feature map FM based on the voice feature data $DF_2$ or the face feature data $DF_1$, and infers the user's emotion state based on the sub feature map FM and the situation determination data P S400 can be performed.

In this time, the sub feature map FM including the feature information extracted from the user and the situation determination data P including a parameter for the importance or use of the feature information can be calculated, and can infer the user's emotion state including the information on the importance or the use thereof in the sub feature map FM.

Then, deriving a result that outputs the inference result of the emotion state in the performing the main inference S400 S500 is performed.

Figure 6:
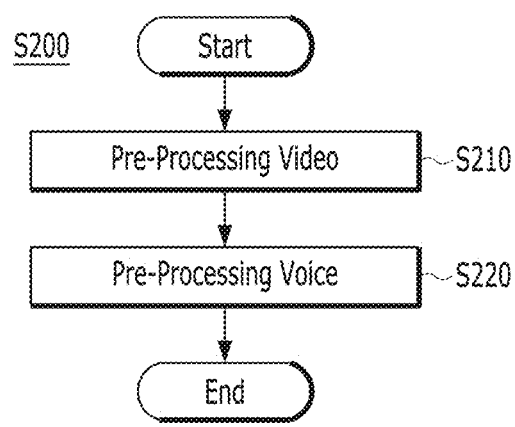
FIG. 6 is a flowchart specifically illustrating pre-processing data in the multi-modal emotion recognition method of FIG. 5.

FIG. 6 is a flowchart specifically illustrating the pre-processing the data in the multi-modal emotion recognition method of FIG. 5.

Referring to FIG. 6, the pre-processing the data S200 includes pre-processing a video S210 and pre-processing a voice S220.

The pre-processing the video S210 performs detecting the recognition target area A, which is an area corresponding to the user's face, in the entire area of the video data DV.

Then, pre-processing an image that corrects the recognition target area A is performed.

Specifically, the pre-processing the image can perform image brightness, blur correction, and noise removal of the video data DV.

Then, detecting a landmark that extracts the face element location information AL of the recognition target area A is performed.

Specifically, the location information of the face important element such as a face, eyes, a nose, a mouth, and a forehead in the recognition target area A is confirmed so that the face can be recognized.

Then, adjusting a location that adjusts the location based on the face element location information AL of the recognition target area A can be performed.

Specifically, the images can be aligned horizontally or vertically based on the face element location information AL extracted from the landmark detection module 213.

Then, extracting a face element that sets a sub recognition target area AA that is located in the recognition target area A and is smaller than the recognition target area A based on the face element location information AL in the recognition target area A, and generates the face feature data $DF_1$ of the sub recognition target area AA can be performed.

In this time, the sub recognition target area AA can be a plurality of areas or one area in which at least one face element such as the whole face, eyes, a mouth, a nose, and a forehead is determined.

For example, when the eyes, the nose, and the mouth, in which the face element location information AL has been extracted in the recognition target area A, are extracted, the face element extraction module 215 can set the eye recognition area $A_1$, the nose recognition area $A_2$, and the mouth recognition area $A_3$ that are the sub recognition target area AA, and can generate at least one face feature data $DF_1$ for the set sub recognition target area AA.

In addition, the extracting the face element can generate the face feature data DF1 based on the recognition target area A when the sub recognition target area AA is not set.

The pre-processing the voice S220 includes correcting a voice and extracting voice feature data.

First, the correction the voice that correcting the voice data DS is performed.

Specifically, the correcting the voice can perform various correction methods such as various noises, external noise removal, a volume control, and frequency correction included in the voice data DS in the correcting the voice to generate the corrected voice data.

The extracting the voice feature data that extracts the feature of the voice data DS that has passed the correcting the voice to generate the voice feature data $DF_2$ is performed.

Specifically, the user's voice feature data DF2 can be generated through one or more modules of voice data, frequency, and spectrum analysis modules such as Mel-Frequency Cepstral Coefficients (MFCC), Geneva Minimalistic Acoustic Parameter Set (eGeMAPS), and Logbank.

In this time, the extracting the voice feature data can also generate the voice feature data $DF_2$ using the corrected voice data, or using the voice data DS without performing the correcting the voice.

In addition, this is illustrative, and at least some steps can be performed concurrently with the preceding or following steps, or can be also performed in reverse order.

Figure 7:
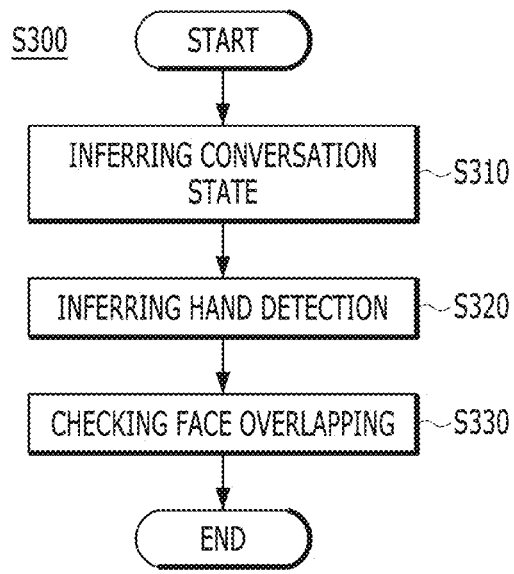
FIG. 7 is a flowchart specifically illustrating performing preliminary inference in the multi-modal emotion recognition method of FIG. 5.

FIG. 7 is a flow chart specifically illustrating performing preliminary inference in the multi-modal emotion recognition method of FIG. 5.

Inferring a conversation state that uses the first learning model $LM_1$, and generates the conversation determination data $P_1$ based on the face feature data $DF_1$ S310 can be performed.

The inferring the conversation state S310 can detect whether or not it is in a conversation state in the previous situation and the feature and motion of the face element from the face feature data $DF_1$ using the first learning model $LM_1$ to detect whether or not it is in a conversation state.

Specifically, using all or a part of the user's face feature data $DF_1$, the conversation determination data $P_1$ that determines whether or not the user is in a conversation state can be generated using the first learning model $LM_1$.

In this time, the face feature data $DF_1$ can include the mouth video data $DV_2$ for the portion corresponding to the user's mouth in the recognition target area A.

In addition, the conversation determination data $P_1$ as to whether or not the user is in a conversation state can be generated from the mouth video data $DV_2$ using the first learning model $LM_1$.

Then, inferring hand detection that detects the hand video data $DV_1$ for the tracking target area B from the video data DV, and generates the location inference data $DM_1$ based on the hand video data $DV_1$ using the second learning model $LM_2$ S320 is performed.

In this time, temporal inference with the previous situation for the hand location can be performed using the second learning model $LM_2$. For example, it is possible to determine whether or not the hand temporarily has overlapped the face.

In addition, the inferring the hand detection S320 can generate the location inference feature map $FM_1$ for the location inference data $DM_1$, and can generate the user's emotion state based on the sub feature map FM, the situation determination data P, and the location inference feature map $FM_1$.

Specifically, the location inference feature map $FM_1$ can include meaningful information on a hand motion such as information on the feature capable of confirming a hand gesture and a hand location.

Then, checking face overlapping that determines whether or not the recognition target area A and the tracking target area B overlap with each other based on the face feature data $DF_1$ and the location inference data $DM_1$, and generates the overlapping determination data $P_2$ according to an overlapping determination result S330 is performed.

Specifically, the overlapping determination data $P_2$ can include one or more parameters for determining the importance and use of the corresponding face feature data DF1 and the corresponding voice feature data $DF_2$ in the recognition target area A by determining whether or not the recognition target area A and the tracking target area B overlap with each other.

Figure 8:
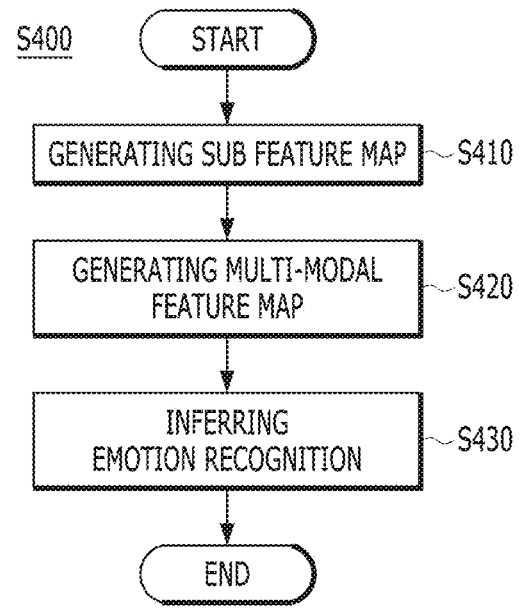
FIG. 8 is a flowchart specifically illustrating performing main inference in the multi-modal emotion recognition method of FIG. 5.

FIG. 8 is a flowchart specifically illustrating performing main inference in the multi-modal emotion recognition method of FIG. 5.

Referring to FIG. 8, the performing the main inference S400 includes generating a plurality of sub feature map S410, generating a multi-modal feature map S420, and inferring emotion recognition S430.

First, the generating the plurality of sub feature maps that generates the plurality of sub feature maps FM for the voice feature data $DF_2$ and the face feature data $DF_1$ based on the voice feature data $DF_2$ and the face feature data $DF_1$ using the third learning model $LM_3$ S410 is performed.

Then, the generating the multi-modal feature map that generates the multi-modal feature map FM from the plurality of sub feature maps FM with reference to the situation determination data P using the third learning map $LM_3$ S420 is performed.

In this time, the situation determination data P can have a predetermined situation determination value PV according to the user's situation, and the generating the multi-modal feature map S420 can include the multi-modal feature map M by applying the situation determination value PV to at least one of the plurality of sub feature maps FM.

In addition, the generating the multi-modal feature map S420 can generate the location inference feature map $FM_1$ from the hand detection inference module 320, and can generate the multi-modal feature map M for inferring the user's emotion state based on the sub feature map FM, the situation determination data P, and the location inference feature map $FM_1$.

Then, using the fourth learning model $LM_4$, the inferring the emotion recognition S430 that infers the emotion state based on the multi-modal feature map M is performed.

In this time, the fourth learning model $LM_4$ can be a temporal learning model such as a cyclic neural network, for example, Long Short-Term Memory (LSTM), Recurrent Neural Network (RNNs), Gated Recurrent Unit (GRU), etc., and can be at least one method of artificial intelligence, machine learning, and deep learning methods that can infer or analyze a temporal feature and a spatial feature.

Figure 9A:
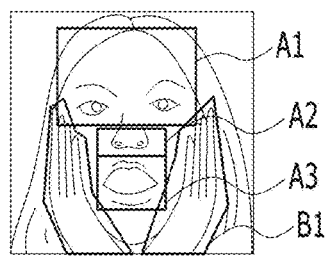
FIGS. 9A to 9C illustrate an emotion recognition procedure according to whether or not a situation changes using the multi-modal emotion recognition device of FIG. 1.
Figure 9B:
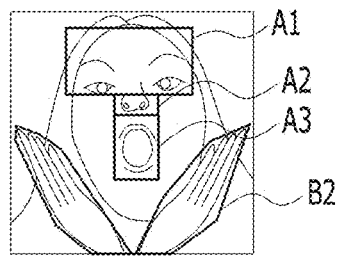
Figure 9C:
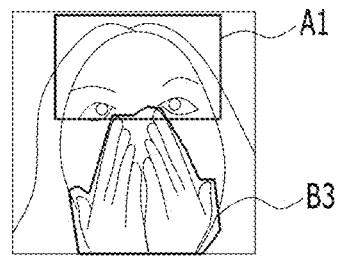

FIGS. 9A to 9C show an emotion recognition procedure according to whether or not the situation changes using the multi-modal emotion recognition device of FIG. 1.

FIG. 9A (Phase A) illustrates a situation where a user puts a hand on a face, and the hand does not cover a mouth and a nose.

The video data DV of the user is input through the video input unit 110, and the voice data DS of the user is inputted through the voice input unit 120.

Thereafter, the video pre-processing unit 210 generates the face feature data $DF_1$ subjected to video pre-processing and also generates the voice feature data $DF_2$ subjected to voice pre-processing through the voice pre-processing unit 220, and the video pre-processing unit 210 sets the recognition target area A including the eye recognition area $A_1$, the nose recognition area $A_2$, and the mouth recognition area $A_3$ based on the face element location information AL of the recognizable eyes, nose, and mouth of the user, and transmits the recognition target area A to the preliminary inference unit 300.

Thereafter, the preliminary inference unit 300 generates the hand video data $DV_1$ for the tracking target area $B_1$ detected from the video data DV.

In this time, the preliminary inference unit 300 generates the location inference data $DM_1$ for confirming the hand motion through the hand video data $DV_1$, and generates the overlapping determination data $P_2$ based on whether or not the tracking target area $B_1$ based on the location inference data $DM_1$ and the recognition target area A overlap with each other.

Herein, the overlapping determination data $P_2$ can include a parameter indicating the use of the eye recognition area $A_1$, the nose recognition area $A_2$, and the mouth recognition area $A_3$.

In addition, the conversation state inference module 310 determines whether or not it is in a conversation state through the mouth recognition area $A_3$ based on the mouth video data $DV_2$ to generate the conversation determination data $P_1$.

Thereafter, the sub feature map generation unit 410 generates the plurality of sub feature maps FM for the face feature data $DF_1$ corresponding to eyes, a nose, and a mouth using the third learning model $LM_3$.

Thereafter, the multi-modal feature map generation unit 420 integrates the plurality of sub feature maps FM and the location inference feature map $FM_1$ corresponding to the hand to generate the multi-modal feature map M.

Thereafter, the emotion recognition is inferred considering the user's previous behavior through the fourth learning model $LM_4$, and this can be expressed as an emotion recognition result.

FIG. 9B (Phase B) illustrates a continuous operation of the Phase A (FIG. 9A).

For example, the Phase B can be assumed to be videos continuously captured at a speed of 30 FPS following the Phase A.

Like in the Phase A, the video data DV of the user is input through the video input unit 110, and the voice data DS of the user is input through the voice input unit 120.

Thereafter, the voice feature data $DF_2$ subjected to voice pre-processing is generated through the voice pre-processing unit 220, and the video pre-processing unit 210 generates the face feature data $DF_1$ and the face element location information AL, sets the recognition target area A including the eye recognition area $A_1$, the nose recognition area $A_2$, and the mouth recognition area $A_3$ based on the face element location information AL, and transmits the recognition target area A to the preliminary inference unit 300.

In this time, the size of the recognition target area A can change according to the user's operation.

The Phase B illustrates that the size of the recognition target area A is changed according to the operation, as compared with the Phase A.

Thereafter, the preliminary inference unit 300 can generate the location inference data DM1 based on the hand video data $DV_1$ to track the hand motion from the Phase A to the Phase B.

The preliminary inference unit 300 generates the overlapping determination data $P_2$ based on whether or not the tracking target area $B_2$ based on the location inference data $DM_1$ and the recognition target area A overlap with each other.

In addition, the preliminary inference unit 300 determines whether or not it is in a conversation state to generate the conversation determination data $P_1$.

In this time, the preliminary inference unit 300 can determine whether or not it is in a conversation state considering whether or not the user who is an emotion recognition target in the previous situation including the Phase A is continuously in a conversation state using the first learning model $LM_1$.

For example, when it is inferred that the user is not in a conversation state in the Phase A, although the mouth shape of the user is, based on the result, temporarily similar to the mouth shape in a conversation state based on the mouth recognition area $A_3$ in the Phase B, the preliminary inference unit 300 can determine that the user is not in a conversation state using the first learning model $LM_1$. That is, the preliminary inference unit 300 can infer whether or not it is in a conversation state in the Phase B that is the next scene thereof based on the conversation state determination result in the Phase A.

Thereafter, the main inference unit 400 generates the plurality of sub feature maps FM for the received face feature data $DF_1$ and the received voice feature data $DF_2$ using the third learning model $LM_3$, and generates the multi-modal feature map M by integrating the plurality of sub feature maps FM and the location inference feature map $FM_1$ corresponding to the hand.

Thereafter, the main inference unit 400 can infer the emotion recognition based on the user's previous behavior in the Phase A (FIG. 9A) through the fourth learning model $LM_4$, and can display it as an emotion recognition result.

FIG. 9C (Phase C after the Phase B), illustrates a behavior that the user covers a mouth with a hand.

The video pre-processing unit 210 sets the recognition target area A including the eye recognition area $A_1$ based on the face element location information AL of the recognizable eyes of the user, and transmits the recognition target area A to the preliminary inference unit 300.

Thereafter, the preliminary inference unit 300 generates the hand video data $DV_1$ for the tracking target area $B_3$ detected from the video data DV. In this time, the location inference data $DM_1$ for confirming the hand motion is generated through the hand video data $DV_1$, and the overlapping determination data $P_2$ is generated based on whether or not the tracking target area $B_3$ based on the location inference data $DM_1$ and the recognition target area A overlap with each other.

Herein, the overlapping determination data $P_2$ can include a parameter indicating the use of the face feature data $DF_1$ based on the eye recognition area $A_1$ or a weight applied to the face feature data $DF_1$.

In addition, the preliminary inference unit 300 can recognize the overlapping between the nose recognition area $A_2$ or the mouth recognition area $A_3$ that has been the recognition target area A and the tracking target area $B_3$ that is the area for the hand location of the user in the Phase A and the Phase B, and the parameter indicating that it is excluded from the emotion recognition inference or the importance is less can be included in the overlapping determination data $P_2$.

In addition, the preliminary inference unit 300 can include a value indicating determining the use of the voice feature data $DF_2$ considering a situation where the mouth video data $DV_2$ corresponded to the mouth recognition area $A_3$ is not recognized and the determination result as to whether or not the user is in the previous conversation state.

Herein, the determination result as to whether or not it is in the previous conversation state is inferred through the temporal learning model. In this time, the temporal learning model can be a temporal learning model such as a cyclic neural network, for example, Long Short-Term Memory (LSTM), Recurrent Neural Network (RNNs), Gated Recurrent Unit (GRU), etc.

Thereafter, the sub feature map generation unit 410 generates the plurality of sub feature maps FM for the face feature data $DF_1$ of the area corresponding to the eyes using the third learning model $LM_3$.

Thereafter, the multi-modal feature map generation unit 420 integrates the plurality of sub feature maps FM and the location inference feature map $FM_1$ corresponding to the hand to generate the multi-modal feature map M.

Thereafter, the emotion recognition inference unit 430 can infer the emotion recognition considering the previous behavior of the user through the fourth learning model $LM_4$, and can express it as an emotion recognition result.

Figure 10A:
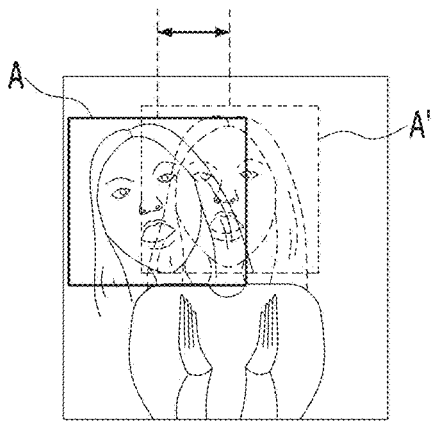
FIGS. 10A and 10B illustrate an emotion recognition procedure according to a situation change using a multi-modal emotion recognition device in accordance with another embodiment of the present disclosure.
Figure 10B:
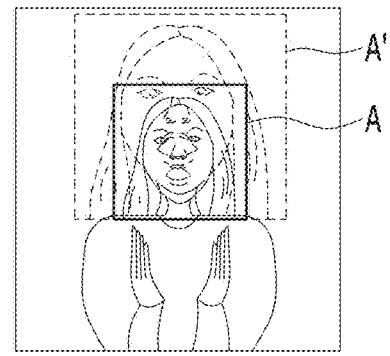

FIGS. 10A and 10B show an emotion recognition procedure according to a change in a situation using the multi-modal emotion recognition device in accordance with another embodiment of the present disclosure.

The present embodiment has only a difference in the emotion recognition configuration according to the change intensity of the recognition target area A, and is substantially the same as the multi-modal emotion recognition device and the method thereof illustrated in FIGS. 1 to 9 in other configurations, such that the following description will focus on the feature parts of the present embodiment.

Referring to FIGS. 10A and 10B, the preliminary inference unit 300 of the multi-modal emotion recognition device 1 in accordance with an embodiment of the present disclosure generates the recognition target area change data with respect to the changes in the displacements d of the recognition target areas A, A' or in the sizes of the recognition target areas A, A'.

More specifically, the recognition target area change data can be included in the situation determination data P, and can be weight data with respect to a change in the recognition target area A, that is, the area corresponding to the face area of the user.

The multi-modal emotion recognition device 1 in accordance with an embodiment of the present disclosure can change an application weight of the recognition target area change data when the change amount of the recognition target area A occurs in the case where the change amount of the head pose of the user, for example, the user shakes the head to the left or right side, or the user approaches toward a camera (the size of the recognition target area A becomes larger) or the user moves toward the opposite side of the camera (the size of the recognition target area A becomes smaller), thus enhancing the accuracy of the user's emotion recognition.

For example, in the present embodiment, when the change amount of the recognition target area A becomes larger, the application weight increases, and when the change amount of the recognition target area A becomes smaller, the application weight reduces.

In this time, the multi-modal feature map generation unit 420 can generate the multi-modal feature map M from the plurality of sub feature maps FM with reference to the situation determination data P including the recognition target area change data.

Figure 11:
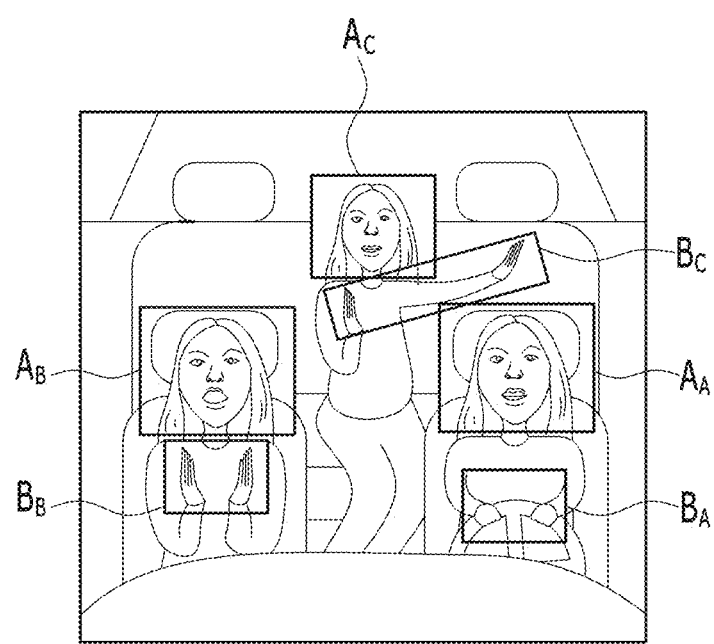
FIG. 11 is an exemplary diagram illustrating an emotion recognition procedure according to a situation change using a multi-modal emotion recognition device in accordance with still another embodiment of the present disclosure.

FIG. 11 is an exemplary diagram illustrating an emotion recognition procedure according to a change in a situation using a multi-modal emotion recognition device in accordance with still another embodiment of the present disclosure.

The present embodiment has only a difference in a configuration in which the recognition target area A and the tracking target area B are formed in plural, and is substantially the same as the multi-modal emotion recognition device and the method thereof illustrated in FIGS. 1 to 9 in other configurations, such that the following description will focus on the feature parts of the present embodiment.

Referring to FIG. 11, the multi-modal emotion recognition device 1 in accordance with an embodiment of the present disclosure can perform the emotion recognition of a plurality of users.

The multi-modal emotion recognition device 1 in accordance with an embodiment of the present disclosure forms a first recognition target area $A_A$ and a first tracking target area $B_A$ for a first user, forms a second recognition target area $A_B$ and a second tracking target area $B_B$ for a second user, and forms a third recognition target area $A_C$ and a third tracking target area $B_C$ for a third user. Then, the multi-modal emotion recognition device 1 can recognize the emotion of the respective users based on the recognition target areas $A_A$, $A_B$, $A_C$ and the tracking target areas $B_A$, $B_B$, $B_C$ that are formed for each user.

In this time, the preliminary inference unit 300 generates the situation determination data for each user based on the tracking target areas $B_A$, $B_B$, $B_C$ and the recognition target areas $A_A$, $A_B$, $A_C$.

In addition, the multi-modal emotion recognition device 1 in accordance with an embodiment of the present disclosure can determine the conversation states of a plurality of users, respectively, to generate unique voice information of each user, and can apply it to the emotion recognition of each user.

For example, when it is determined that the first user is in a conversational state, and the second user and the third user are not in a conversational state in a first situation, the multi-modal emotion recognition device 1 can recognize that the voice information acquired in the first situation is the voice information of the first user. The multi-modal emotion recognition device 1 can repeatedly perform the above procedure to generate the unique voice information of each user. In this time, the voice information can include a parameter for the unique wavelength of the voice.

Meanwhile, when it is determined that at least two users among a plurality of users are in a conversation state simultaneously, the multi-modal emotion recognition device 1 can distinguish the conversation state of each user based on the voice information of each user from the acquired conversations, thus performing the emotion recognition of each user.

Meanwhile, when a specific voice is unknown, the multi-modal emotion recognition device 1 in accordance with the present embodiment can determine whether or not a specific user is in a conversation state based on the mouth shape image of the user, and when it is determined that any specific user is in a conversation state, a specific voice can be identified as being the user's voice in a conversation state.

In addition, a specific person's voice is input at any specific timing in a situation where three persons are in a conversation state, but when it has been confirmed that the first user and the second user are not in a conversation state and when it is difficult to determine the conversation state because the remaining third user covers his/her mouth, the multi-modal emotion recognition device 1 in accordance with the present embodiment identifies the voice input at the specific timing as the voice of the third user to perform the emotion recognition for the users.

The proposed embodiment can be applied to a situation where a plurality of users simultaneously stare one or two or more cameras without facing each other. For example, embodiments of the present disclosure can be applied to a situation where a plurality of users are watching one display simultaneously, or a situation where a plurality of users are aboard in a vehicle.

FIGS. 12A to 12G show an emotion recognition procedure according to a change in a situation using the multi-modal emotion recognition device in accordance with yet another embodiment of the present disclosure. The present embodiment has only a difference in a configuration that excludes the video frame that cannot form the feature map, provides a weight of the video frame that can form the feature map, and recognizes the user's emotion, and is substantially the same as the multi-modal emotion recognition device and the method thereof illustrated in FIGS. 1 to 9C in other configurations, such that the following description will focus on the feature parts of the present embodiment.

Referring to FIGS. 12A to 12G, the multi-modal emotion recognition device 1 in accordance with an embodiment of the present disclosure does not apply the temporal learning model for a specific frame that cannot form the feature map when any specific frame of a plurality of frames of the video for recognizing the user's emotion is damaged by excessive lighting or an unexpected data error, etc. and the feature map for the specific frame cannot be formed. Instead of the specific frame to which the temporal learning model is not applied, the multi-modal emotion recognition device 1 sets the last frame immediately before the specific frame, that is, in which the feature map is formed as a replacement frame of the specific frame to apply the temporal learning model to the replacement frame. In this time, a weight according to the time that could not form the feature map, etc. is applied to the replacement frame to apply the temporal learning model thereto.

The temporal learning model can be a temporal learning model such as a cyclic neural network, for example, Long Short-Term Memory (LSTM), Recurrent Neural Network (RNNs), Gated Recurrent Unit (GRU), etc.

For example, as illustrated in FIGS. 12A and 12B, in a first frame $F_1$ and a second frame $F_2$, the recognition target area A and the tracking target area B for forming the feature map are detected. Meanwhile, as illustrated in FIGS. 12C to 12E, in the third frame $F_3$ to the fifth frame $F_5$, the recognition target area A and the tracking target area B for forming the feature map by excessive lighting, etc. are not detected. Then, as illustrated in FIGS. 12G and 12G, in the sixth frame $F_6$ and the seventh frame $F_7$, the recognition target area A and the tracking target area B for forming the feature map are detected. The first frame $F_1$ to the seventh frame $F_7$ are consecutive frames according to the time sequence, and the time at which the multi-modal emotion recognition device 1 cannot form the feature map, that is, the feature map non-detection time $t_{gap}$ is the time from the third frame $F_3$ to the fifth frame $F_5$. In addition, the second frame $F_2$ is the last frame immediately before the feature map non-detection section corresponding to the feature map non-detection time $t_{gap}$, that is, in which the recognition target area A and the tracking target area B are detected so that the feature map is formed, and in the present embodiment, the second frame $F_2$ can become the replacement frame of the third frame $F_3$ to the fifth frame $F_5$.

Meanwhile, the multi-modal emotion recognition device 1 in accordance with the present embodiment applies a replacement weight w to the replacement frame when the temporal learning model is applied to the replacement frame.

The replacement weight w in accordance with the present embodiment satisfies the following equation.

$$w = \begin{cases} 1, t_{gap} \leq T_{min} \\ 0, t_{gap} \geq T_{max} \\ \dfrac{T_{max} - t_{gap}}{T_{max} - T_{min}}, \text{otherwise} \end{cases} \quad \text{Equation 1}$$

In this time, the $T_{min}$ refers to a reference minimum time, and $T_{max}$ to a reference maximum time.

The multi-modal emotion recognition device 1 in accordance with the present embodiment applies the replacement weight w for the replacement frame, 1, that is, the same weight as the other frames (in the present embodiment, the first frame $F_1$, the second frame $F_2$, the sixth frame $F_6$, and the seventh frame $F_7$) in which the feature map can be generated to apply the temporal learning model, when the feature map non-detection time $t_{gap}$ is smaller than or equal to the reference minimum time $T_{min}$. That is, when the feature map non-detection time $t_{gap}$ is excessively insufficient, the temporal learning model during the feature map non-detection time $t_{gap}$ is applied in the same manner as the other frames so that the emotion recognition for the user can be continuously performed.

In addition, the multi-modal emotion recognition device 1 sets the replacement weight w to zero when the feature map non-detection time $t_{gap}$ is greater than or equal to the reference maximum time $T_{max}$. That is, when the feature map non-detection time $t_{gap}$ is excessively great, the application of the temporal learning model during the feature map non-detection time $t_{gap}$ is excluded, thus preventing distortion of an emotion recognition result.

Then, when the feature map non-detection time $t_{gap}$ is greater than the reference minimum time $T_{min}$ or smaller than the reference maximum time $T_{max}$, the replacement weight w is a result value obtained by dividing a value $v_1$, which subtracts the feature map non-detection time $t_{gap}$ from the reference maximum time $T_{max}$, by a difference value $v_2$ between the reference maximum time $T_{max}$ and the reference minimum time $T_{min}$. That is, the replacement weight w becomes larger as the feature map non-detection time $t_{gap}$ approaches the reference minimum time $T_{min}$, and becomes smaller as the feature map non-detection time $t_{gap}$ approaches the reference maximum time $T_{max}$.

The present embodiment describes that the immediately preceding frame of the feature map non-detection section is set as the replacement frame, but a configuration that the frame immediately after the feature map non-detection section ends, that is, the sixth frame $F_6$ is set as the replacement frame can be included in this embodiment of the present disclosure.

Conventionally, there has been a problem in that when the feature map is not detected by excessive lighting, etc., the emotion recognition is performed again from the timing when the feature map is detected, thus disconnecting continuous emotion recognition and reducing the accuracy of the emotion recognition. Accordingly, according to an embodiment of the present disclosure, it is possible to replace the frame in which the feature map is not detected with the replacement frame in which the feature map can be detected to perform the emotion recognition of the user, thus performing continuous emotion recognition and enhancing the accuracy of the emotion recognition.

As described above, although the present disclosure has been described with reference to the limited embodiments and drawings, various modifications and changes from the above descriptions can be made by those skilled in the art. For example, appropriate results can be achieved even if the described techniques can be performed in a different order than the described method, and/or the components of the described systems, structures, devices, circuits, etc. can be coupled or combined in forms different from the described method, or are replaced or substituted with another component or equivalent thereof.

Accordingly, other implementations, other embodiments, and equivalents to the claims are also within the scope of the following claims. Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The system or device described above can be implemented by a hardware component, a software component, and/or a combination of the hardware component and the software component. For example, the system, device, and component described in the embodiments, such as a processor, a controller, an Arithmetic Logic Unit (ALU), a Digital signal processor, a microcomputer, a Field Programmable Array (FPA), a Programmable Logic Unit (PLU), a microprocessor, or any other devices capable of executing and responding to instructions can be implemented by using one or more general computer or a special-purpose computer. The processing device can execute an Operating System (OS) and one or more software applications running on the Operating System. In addition, the processing device can also access, store, operate, process, and generate data in response to execution of the software. For convenience of understanding, one processing device is described as being used, but those skilled in the art will recognize that the processing device can be configured to include a plurality of processing elements and/or a plural types of processing elements. For example, the processing device can include a plurality of processors or one processor and one controller. In addition, other processing configurations, such as a parallel processor, are also possible.

The software can include a computer program, a code, an instruction, or one or more combination of the foregoing, and can constitute the processing device to operate as desired, or instruct the processing device collectively or independently. The software and/or the data can be in the form of any type of machine, component, physical device, virtual equipment, computer storage medium or device, or can be permanently or temporarily embodied in a signal wave transmitted therefrom so that they are analyzed by the processing device or are provided to the processing device. The software can be distributed over a computer system connected via a network, and can be also stored or executed by a distributed method. The software and the data can be stored on one or more computer readable recording medium.

The method in accordance with the embodiments can be implemented in the form of program instructions that can be executed through various computer means to be recorded on a computer readable medium. The computer-readable medium can include program instruction, data, data structure, etc. alone or in combination thereof. The program instruction recorded on the medium can be those specially designed and constructed for the present embodiment, or can be available to those skilled in the art of computer software. Examples of the computer-readable storage medium include magnetic media such as a hard disk, a floppy disk, and a magnetic tape, optical media such as CD-ROM and DVD, magneto-optical media such as a floptical disk, and a hardware device specifically configured to store and execute program instructions such as ROM, RAM, and flash memory. Examples of the program instruction include not only a machine language code such as those generated by a compiler, but also a high-level language code that can be executed by a computer using an interpreter, etc.

Various embodiments of the present disclosure described above can be applied independently or complementarily to each embodiment.

The present disclosure relates to the multi-modal emotion recognition device and method, and is applicable to various devices or methods for recognizing the user's emotion and can be used in industry because of the repeat possibility.

| | |
|---|---|
| 10: | multi-modal emotion recognition device |
| 100: | data input unit |
| 110: | video input unit |
| 120: | voice input unit |
| 200: | data pre-processing unit |
| 210: | video pre-processing unit |
| 211: | face detection module |
| 212: | image pre-processing module |
| 213: | landmark detection module, |
| 214: | location adjustment module |
| 215: | face element extraction module |
| 220: | voice pre-processing unit |
| 221: | voice correction module |
| 222: | voice feature data extraction module |
| 300: | preliminary inference unit |
| 310: | conversation state inference module |
| 320: | hand detection inference module |
| 330: | face overlapping checking module |
| 400: | main inference unit |
| 411: | first sub feature map generation unit |
| 412: | second sub feature map generation unit |
| 413: | third sub feature map generation unit |
| 414: | nth sub feature map generation unit |
| 420: | multi-modal feature map generation unit |
| 430: | emotion recognition inference unit |
| 500: | output unit |
| S100: | inputting data |

| | |
|---|---|
| S200: | pre-processing data |
| S210: | pre-processing video |
| S220: | pre-processing voice |
| S300: | performing preliminary inference |
| S310: | inferring conversation state |
| S320: | inferring hand detection |
| S330: | checking face overlapping |
| S400: | performing main inference |
| S410: | generating sub feature map |
| S420: | generating multi-modal feature map |
| S430: | inferring emotion recognition |
| S500: | deriving result |
| A: | recognition target area |
| $A_1$: | eye recognition area |
| $A_2$: | nose recognition area |
| $A_3$: | mouth recognition area |
| $B_1, B_2, B_3$: | tracking target areas |

What is claimed is:

1. A multi-modal emotion recognition device using artificial intelligence, comprising:
a data input unit for receiving video data and voice data of a user;
a data pre-processing unit comprising a voice pre-processing unit for generating voice feature data from the voice data and a video pre-processing unit for generating one or more face feature data from the video data;
a preliminary inference unit for generating situation determination data as to whether or not the user's situation changes according to a temporal sequence based on the video data; and
a main inference unit for generating at least one sub feature map based on the voice feature data or the face feature data, and inferring the user's emotion state based on the sub feature map and the situation determination data,
wherein the situation determination data comprises conversation determination data as to whether or not the user is in a conversation state or overlapping determination data as to whether or not a tracking target area that is a part of the entire video area of the video data and a recognition target area that is different from the tracking target area overlap with each other,
wherein the preliminary inference unit generates the conversation determination data for determining whether or not the user is in a conversation state based on the face feature data, or
wherein the preliminary inference unit generates location inference data for inferring the location of the tracking target area based on the video data, and generates the overlapping determination data as to whether or not the tracking target area and the recognition target area overlap with each other based on the face feature data and the location inference data.

2. The multi-modal emotion recognition device using artificial intelligence of claim 1,
wherein the preliminary inference unit comprises a conversation state inference module for using a first learning model, and generating the conversation determination data based on the face feature data.

3. The multi-modal emotion recognition device using artificial intelligence of claim 2,
wherein the face feature data comprises mouth video data that is video data for a portion corresponding to the user's mouth in the recognition target area, and
wherein the conversation state inference module generates the conversation determination data as to whether or not the user is in a conversation state from the mouth video data using the first learning model.

4. The multi-modal emotion recognition device using artificial intelligence of claim 1,
wherein the preliminary inference unit comprises
a hand detection inference module for detecting hand video data for the tracking target area from the video data, and generating the location inference data based on the hand video data using a second learning model; and
a face overlapping checking module for determining whether or not the recognition target area and the tracking target area overlap with each other based on the face feature data and the location inference data, and generating the overlapping determination data according to an overlapping determination result.

5. The multi-modal emotion recognition device using artificial intelligence of claim 4,
wherein the hand detection inference module generates a location inference feature map for the location inference data, and
infers the user's emotion state based on the sub feature map, the situation determination data, and the location inference feature map.

6. The multi-modal emotion recognition device using artificial intelligence of claim 1,
wherein the situation determination data further comprises recognition target area change data for a change in the recognition target area, and
wherein a weight of the recognition target area change data increases as the change amount of the recognition target area becomes larger.

7. The multi-modal emotion recognition device using artificial intelligence of claim 1,
wherein the tracking target area and the recognition target area are formed for a plurality of users, respectively, and
wherein the preliminary inference unit generates the situation determination data for each user based on the tracking target area and the recognition target area, and determines a conversation state for the plurality of users, respectively, to generate unique voice information of each user, and applies it to the emotion recognition of each user.

8. A multi-modal emotion recognition device using artificial intelligence, comprising:
a data input unit for receiving video data and voice data of a user;
a data pre-processing unit comprising a voice pre-processing unit for generating voice feature data from the voice data and a video pre-processing unit for generating one or more face feature data from the video data;
a preliminary inference unit for generating situation determination data as to whether or not the user's situation changes according to a temporal sequence based on the video data; and
a main inference unit for generating at least one sub feature map based on the voice feature data or the face feature data, and inferring the user's emotion state based on the sub feature map and the situation determination data,
wherein the main inference unit comprises:
a plurality of sub feature map generation unit for generating the plurality of sub feature maps for the voice feature data and the face feature data based on the voice feature data and the face feature data using a third learning model;

a multi-modal feature map generation unit for generating a multi-modal feature map from the plurality of sub feature map with reference to the situation determination data; and an emotion recognition inference unit for inferring the emotion state based on the multi-modal feature map using a fourth learning model, wherein the situation determination data has a predetermined situation determination value according to the user's situation, and wherein the multi-modal feature map generation unit generates the multi-modal feature map by applying the situation determination value to at least one of the plurality of sub feature maps.

9. The multi-modal emotion recognition device using artificial intelligence of claim 8, wherein the voice pre-processing unit comprises a voice correction module for correcting the voice data; and a voice feature data extraction module for extracting the feature of the voice data that has passed the voice correction module to generate the voice feature data.

10. A multi-modal emotion recognition method using artificial intelligence, comprising:

a data input unit for receiving video data and voice data of a user;

a data pre-processing unit comprising a voice pre-processing unit for generating voice feature data from the voice data and a video pre-processing unit for generating one or more face feature data from the video data;

a preliminary inference unit for generating situation determination data as to whether or not the user's situation changes according to a temporal sequence based on the video data; and a main inference unit for generating at least one sub feature map based on the voice feature data or the face feature data, and inferring the user's emotion state based on the sub feature map and the situation determination data, wherein the video data comprises a plurality of frames, wherein when a feature map cannot be formed based on any specific frames of the plurality of frames, application of a temporal learning model to all frames that cannot form the feature map is excluded, the last frame in which the feature map immediately before the frame that cannot form the feature map is formed is set as a replacement frame, and the user's emotion state is recognized by applying the temporal learning model to the replacement frame, and wherein time corresponding to the all frames that cannot form the feature map is a feature map non-detection time, and the temporal learning model is applied to the replacement frame during the feature map non-detection time.

11. A multi-modal emotion recognition method using artificial intelligence, comprising:

inputting data that receives video data and voice data of a user;

pre-processing data comprising pre-processing voice that generates voice feature data from the voice data and pre-processing video that generates one or more face feature data from the video data;

performing preliminary inference that generates situation determination data as to whether or not the user's situation changes according to a temporal sequence based on the video data; and performing main inference that generates at least one sub feature map based on the voice feature data or the face feature data, and infers the user's emotion state based on the sub feature map and the situation determination data, wherein the situation determination data comprises conversation determination data as to whether or not the user is in a conversation state or overlapping determination data as to whether or not a tracking target area that is a part of the entire video area of the video data and a recognition target area that is different from the tracking target area overlap with each other, wherein the performing preliminary inference generates the conversation determination data for determining whether or not the user is in a conversation state based on the face feature data, or wherein the performing preliminary inference generates location inference data for inferring the location of the tracking target area based on the video data, and generates the overlapping determination data as to whether or not the tracking target area and the recognition target area overlap with each other based on the face feature data and the location inference data.

12. The method of claim 11, wherein the performing the preliminary inference comprises inferring a conversation state that uses a first learning model, and generates the conversation determination data based on the face feature data, wherein the face feature data comprises mouth video data that is video data for a portion corresponding to the user's mouth in the recognition target area, and wherein the inferring the conversation state generates the conversation determination data as to whether or not the user is in a conversation state from mount video data using the first learning model.

13. The method of claim 11, wherein the performing the preliminary inference comprises inferring hand detection that detects hand video data for the tracking target area from the video data, and generates the location inference data based on the hand video data using a second learning model; and checking face overlapping that determines whether or not the recognition target area and the tracking target area overlap with each other based on the face feature data and the location inference data, and generates the overlapping determination data according to an overlapping determination result.

14. The method of claim 13, wherein the inferring the hand detection generates a location inference feature map for the location inference data, and infers the user's emotion state based on the sub feature map, the situation determination data, and the location inference feature map.

15. The method of claim 14, wherein the performing the main inference comprises generating a plurality of sub feature maps that generates the plurality of sub feature maps for the voice feature data and the face feature data based on the voice feature data and the face feature data using a third learning model;

generating a multi-modal feature map that generates a multi-modal feature map from the plurality of sub feature maps with reference to the situation determination data; and inferring emotion recognition that infers the emotion state based on the multi-modal feature map using a fourth learning model.

16. The method of claim 15,
wherein the situation determination data has a predetermined situation determination value according to the user's situation, and
wherein the generating the multi-modal feature map generates the multi-modal feature map by applying the situation determination value to at least one of the plurality of sub feature maps.

17. A non-transitory computer readable storage medium for storing computer program codes for performing the method of claim 11.

* * * * *